US006258890B1

(12) United States Patent
Schmidt-Thuemmes et al.

(10) Patent No.: US 6,258,890 B1
(45) Date of Patent: *Jul. 10, 2001

(54) USE OF AN AQUEOUS POLYMER DISPERSION TO PRODUCE WATER-VAPOR BARRIERS

(75) Inventors: Jürgen Schmidt-Thuemmes, Neuhofen; Eckehardt Wistuba, Bad Dürkheim; Andree Dragon, Speyer; Thomas Anselmann, Landau, all of (DE)

(73) Assignee: BASF Aktiengesellshaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,924

(22) Filed: Nov. 8, 1996

(30) Foreign Application Priority Data

Nov. 11, 1995 (DE) ................................................ 195 42 077

(51) Int. Cl.[7] ...................................................... C08K 5/06

(52) U.S. Cl. ........................... 524/555; 524/560; 524/561; 524/562; 428/508; 428/510; 428/514; 428/522

(58) Field of Search ...................................... 524/575, 555, 524/560, 561, 562; 428/508, 510, 514, 522

(56) References Cited

U.S. PATENT DOCUMENTS 2,847,404  8/1958  Hoertz ..................................... 260/80
3,795,647 * 3/1974  Ripley-Duggan .................... 524/166

FOREIGN PATENT DOCUMENTS 2 342 992   9/1977  (FR) .
737 158     9/1955  (GB) .

* cited by examiner

Primary Examiner—Peter D. Mulcahy
(74) Attorney, Agent, or Firm—Oblon, Spivak, McClelland, Maier & Neustadt, P.C.

(57) ABSTRACT

An aqueous polymer dispersion whose polymer is composed of vinyl-aromatic structures and conjugated dienes, and which has a reduced content of alkali metal ions, is used for producing water-vapor barriers; the invention also relates to the aqueous, low alkali metal polymer dispersion itself.

41 Claims, No Drawings

USE OF AN AQUEOUS POLYMER DISPERSION TO PRODUCE WATER-VAPOR BARRIERS

The present invention relates to the use of an aqueous polymer dispersion whose polymer, present in disperse distribution, is composed in free-radically polymerized form of from 20 to 65% by weight of at least one vinyl-aromatic monomer (monomers A), from 35 to 80% by weight of at least one monomer having two conjugated ethylenically unsaturated double bonds (monomers B), and from 0 to 10% by weight of other monomers having at least one ethylenically unsaturated double bond (monomers C)

and whose content of alkali metal ions, based on the mass of the dispersed polymer, is $\leq 0.5\%$ by weight for producing water-vapor barriers. The present invention additionally relates to the preparation of such an aqueous polymer dispersion and to the aqueous polymer dispersion itself.

Air normally contains a certain amount of water vapor which exerts a defined partial pressure. This water vapor uptake by the air is limited and depends on the temperature. As the temperature rises, there is a great increase in the water vapor uptake capacity. At the maximum amount of vapor, the partial pressure is equal to the saturation pressure of water at the same temperature. The percentage ratio of the amount of vapor present in the air to the maximum possible amount is termed relative atmospheric humidity. Given a constant absolute moisture content, the relative atmospheric humidity falls as the temperature rises and, conversely, rises on cooling. On going below the dew point temperature, however, the amount of vapor present in excess of the saturation level condenses to form dew.

Where a porous wall, for example, separates two areas having different partial pressures of air and water vapor, then molecules of water vapor or, respectively, air pass through this wall in order to compensate the concentration or pressure. If the wall at the same time has a temperature gradient along its thickness, the saturation pressure of water may be exceeded within the wall and there may as a result be formation of dew which damages the wall (eg. reduction in its thermal insulating effect, development of molds, etc.). Against this background it is desirable, for example, to make the internal walls of damp rooms (the term damp rooms as used herein refers to rooms whose atmosphere has an increased water-vapor content relative to the atmosphere of their surroundings; examples of damp rooms are kitchens, bathrooms, dairy rooms, industrial rooms, cellar rooms) as impermeable as possible to water vapor, ie. to provide them with a water-vapor barrier. Similar comments apply to the external walls of rooms whose surrounding atmosphere has a relatively increased water-vapor content (eg. the external walls of refrigeration rooms). A further area of application for water-vapor barriers is constituted by wood coatings. Owing to its hygroscopic nature, wood shrinks or swells in accordance with changing relative atmospheric humidity, as a consequence of the uptake or release of water to which this change in humidity gives rise; the wood warps, which is generally accompanied by damage to the coating on the wood. It is therefore desirable either to give the wood surface a water-vapor impermeable finish before applying the actual protective coating, or to make the wood coating itself impermeable to water vapor.

From Römpps Chemie-Lexikon, eighth edition, 1981, Cm-G, Franck Verlag, Stuttgart p. 974 it is known that the aqueous Diofan® polymer dispersions of BASF AG are able to form films having high impermeability to water vapor. Correspondingly, the technical information bulletins TI/ED 1037 d, September 1993 and TI/ED 1652 d, May 1993 from BASF AG recommend films of Diofan A 601 and of Diofan A 690 as water-vapor barriers both for typical wall surface materials, such as cement slurry coats, concrete, gypsum, plasterboard, wooden particle board or chipboard, plywood, hardboard and masonry, and for wood itself.

In this context the water-vapor barrier effect can be obtained in a simple manner by coating the respective surface either with the aqueous polymer dispersion itself or with an appropriate composition containing the aqueous polymer dispersion as binder. When the coating dries, the polymer film exerting the barrier effect is formed.

It is worth noting that the abovementioned Diofan grades are aqueous dispersions of copolymers formed from relatively polar monomers (vinylidene chloride and n-butyl acrylate), which shows that the question of the water-vapor permeability of a polymer film must be considered separately from the question of the polarity of the polymer on which the film is based.

A further notable property of these Diofans is that they are able to form films of enhanced elasticity at the most common application temperatures (from 5 to 35° C.). This is important insofar as the substrates which are to be given a water-vapor impermeable finish generally have cracks whose expansion is subject to fluctuations in the case of temperature change. Owing to their enhanced elasticity, the Diofan films are able to follow these fluctuations in an advantageous manner without themselves cracking (crack sites open up the passage of water vapor) and thus forming a long-term barrier to water vapor.

A notable feature is that the Diofans are able to transfer the abovementioned profile of properties even to coating compositions which in addition to the Diofan comprise to a proportion of up to 60% of their overall volume solids content of added, finely divided mineral materials, such as fillers and pigments (while fillers and pigments are normally distinguished from one another on the basis of their different degrees of fine division and of their different refractive index, the term pigment as used herein should be interpreted here as including both; correspondingly, the volume proportion mentioned above forms the pigment volume concentration (PVC)). This opens up the possibility of giving the water-vapor barriers visual appeal and of producing them, in a simple manner, with variable coat thicknesses.

The Diofan films also have an outstanding capacity for adhering to the materials mentioned as possibilities for wall surfaces.

A disadvantage of the Diofans, however, is that the vinylidene chloride which they contain in polymerized form is subject to progressive hydrolysis over time under the action of the aqueous dispersion medium, in the course of which hydrolysis hydrogen chloride is formed. The latter is an unwanted contaminant and has an adverse effect, inter alia, on the stability on storage and the thickening of formulation properties of corresponding coating formulations (for example, finely divided $CaCo_3$ pigment is attacked by the evolution of hydrogen chloride).

It is an object of the present invention, therefore, to provide aqueous polymer dispersions for use for producing water-vapor barriers which on the one hand encompass the described, advantageous profile of properties of the Diofans and on the other hand do not have the described disadvantages of the Diofans.

We have found that this object is achieved in that aqueous polymer dispersions whose polymer, present in disperse distribution, is composed in free-radically polymerized form of from 20 to 65% by weight of at least one vinyl-aromatic monomer (monomers A), from 35 to 80% by weight of at least one monomer which contains two conjugated ethylenically unsaturated double bonds (monomers B), and from 0 to 10% by weight of other monomers containing at least one ethylenically unsaturated double bond (monomers C)

(based on the total quantity of monomers A–C incorporated by polymerization) and whose content of alkali metal ions, based on the mass of the dispersed polymer and referred to below simply as GA, is ≦0.5% by weight are suitable in the manner required for producing water-vapor barriers.

Monomers A suitable in accordance with the invention include styrene and the vinyltoluenes (methylstyrene). Styrene is preferably employed. Monomers B suitable in accordance with the invention include butadiene, 2-methylbutadiene (isoprene) and 2,3-dimethylbutadiene.

Suitable monomers C include vinyl esters of alkanecarboxylic acids having 1 to 3 carbon atoms, esters of methacrylic acid or acrylic acid with alkanols having 1 to 8 carbon atoms, α, β-monoethylenically unsaturated mono- and dicarboxylic acids having 3 to 6 carbon atoms, the amides and nitriles of these carboxylic acids, and also olefins such as ethylene. Examples of possible monomers C are thus vinyl formate, vinyl acetate, vinyl propionate, acrylic acid, methacrylic acid, itaconic acid, maleic acid, acrylamide, methacrylamide, acrylonitrile, methacrylonitrile, methyl acrylate, ethyl acrylate, n-butyl acrylate, tert-butyl acrylate, isobutyl acrylate, 2-ethylhexyl acrylate and the corresponding methacrylates.

The aqueous polymer dispersions to be used according to the invention thus comprise embodiments whose polymer particles, present in disperse distribution, contain from 40 to 60% by weight of monomers A (eg. styrene) and from 40 to 60% by weight of monomers B (eg. butadiene) in copolymerized form. In accordance with the invention, however, the abovementioned proportions by weight may also be from 50 to 60% by weight (monomers A) and from 40 to 50% by weight (monomers B). The quantity of monomers C present in copolymerized form in the dispersely distributed polymers is frequently only up to 5 or up to 3 or up to 2% by weight, and often at least 0.5% by weight.

In one possible embodiment of the present invention the monomers C are selected from the group consisting of α, β-monoethylenically unsaturated mono- and dicarboxylic acids having 3 to 6 carbon atoms, and their amides. This group frequently comprises acrylic acid, methacryic acid, itaconic acid, acrylamide and methacrylamide. It has been found useful to use a mixture of α, β-monoethylenically unsaturated carboxylic acids, having 3 to 6 carbon atoms, and their amides as monomers C. A mixture of this kind may be composed, for example, of acrylic acid and acrylamide or of acrylic acid, itaconic acid and acrylamide.

The z-mean polymer particle diameter $\bar{d}_z$ of the aqueous polymer dispersions to be employed in accordance with the invention is in general from ≧100 nm to ≧250 nm, frequently also from ≧140 nm to ≦200 nm, and can be determined by the method of quasielastic light scattering. The pH of the aqueous dispersion medium (at 25° C. and 1 atm) of the aqueous polymer dispersions to be used in accordance with the invention is preferably ≧6 (glass electrode). The favorable pH ranges are from 6 to 10, in particular from 7 to 10 and from 8 to 9. These pH ranges are preferred, inter alia, because on the one hand they permit increased stability of the disperse distribution of the polymer particles themselves, and on the other hand permit increased stability of the homogeneous distribution of any finely divided pigments which are to be used in addition.

It is essential to the invention that the alkali metal ion content of the aqueous polymer dispersions to be used in accordance with the invention, based on the mass of the dispersed polymer, is ≦0.5% by weight. Surprisingly, the lower this GA value of the aqueous polymer dispersions to be used in accordance with the invention, the higher is the resulting water-vapor barrier effect of their films. In other words, permissible GA values in accordance with the invention may be ≦0.4% by weight, ≦0.3% by weight, ≦0.2% by weight, ≦0.1% by weight, ≦0.05% by weight and, preferably, 0% by weight. In accordance with the invention it is not disadvantageous if corresponding restrictions are set regarding the content of alkaline earth metal ions and other metal ions.

The aqueous polymer dispersions to be used in accordance with the invention can be prepared from their starting monomers A–C in a manner known per se by the method of free-radical aqueous emulsion polymerization, ie. with the addition of free radical polymerization initiators, dispersant and, if desired, molecular weight regulators. The most simple procedure here is to charge all starting substances with stirring into the polymerization vessel and then to set the desired polymerization temperature. The composition of the polymerization batch, especially of the monomers A–C, is advantageously chosen so that the glass transition temperature Tg of the film of the resulting aqueous polymer dispersion (determined by means of differential scanning calorimetry, 20° C./min., midpoint) is from −30 to +15°, frequently from −10 to +5° C. The connection between glass transition temperature and monomer composition is known to the skilled worker for random copolymers, and for copolymer molecular weights of more than 50,000 relative molecular weight units, in good approximation by the Fox equation.

According to Fox, (F. G. Fox, Bull. Am. Phys. Soc. (Ser. II) 1, 123 [1956] and Ullmanns Encyclopädie der technischen Chemie, 4th edition Vol. 19, 1980, VCH Chemie, p. 18 it is true in good approximation, for the glass transition temperature of copolymers, that:

$$\frac{1}{T_g} = \frac{X^1}{T_g^1} + \frac{X^2}{T_g^2} + \cdots \frac{X^n}{T_g^n},$$

where $X^1, X^2, \ldots, X^n$ are the mass fractions of the monomers 1, 2, . . . , n and $T_g^1$, $T_g^2$, $T_g^n$ are the glass transition temperatures of the homopolymers of each of the monomers 1, 2, . . . , n, in kelvin. The glass transition temperatures of these homopolymers of the abovementioned monomers are known and are listed, for example, in J. Brandrup, E. H. Immergut, Polymer Handbook 1st Ed., J. Wiley, New York 1966, 2nd Ed., J. Wiley, New York 1975, und 3rd Ed., J. Wiley, New York, 1989 and Ullmann's Encyclopedia of Industrial Chemistry, VCH Chemie, Vol. A 21, 1992, p. 169, Table 8.

Suitable free-radical initiators for the aqueous free-radical emulsion polymerization are, in particular, those which are soluble in the aqueous medium in the required amount. These initiators may be peroxides, peroxodisulfuric acid and its salts, or azo compounds. They preferably include no alkali metal element or no metal element at all; in other words, ammonium peroxodisulfate is preferred over sodium peroxodisulfate in accordance with the invention. The polymerization temperature is normally adapted to the initiator system used and can be from 0 to 130° C. When peroxodisulfuric acid or its salts is used, it is generally from 70 to 130° C., preferably from 75 to 100° C. The operating pressure in the course of aqueous free-radical emulsion polymerization is adapted to the polymerization temperature and to the volatility of the monomers, and can be from 1 to 10 atm or more. Low polymerization temperatures are made possible by combined initiator systems composed of at least one reducing agent and at least one peroxide and/or hydroperoxide, eg. tert-butyl hydroperoxide and hydroxymethanesulfinic acid or its salts, or hydrogen peroxide and ascorbic acid. Particularly low polymerization temperatures are made possible by the use of combined initiator systems which, moreover, contain a small amount of a metal component which is soluble in the polymerization medium and whose metallic component may occur in a number of valency states. An example which may be mentioned is the combination ascorbic acid/iron(II) sulfate/hydrogen peroxide. The amount of free-radical polymerization initiator used is generally, based on the overall quantity of monomers, from 0.1 to 3% by weight, particular preference being given to the use of peroxodisulfuric acid and its salts.

To ensure the stability of the resulting aqueous polymer dispersion, it is common in the case of free-radical aqueous emulsion polymerization to use dispersants as well. Suitable as dispersants are all those customarily employed, ie. both protective colloids and emulsifiers. Examples of suitable protective colloids are polyvinyl alcohols, cellulose derivatives or vinylpyrrolidone-containing copolymers. A detailed description of further suitable protective colloids is in Houben-weyl, Methoden der organischen Chemie, Volume XIV/1, Makromolekulare Stoffe [Macromolecular substances], Georg-Thieme-Verlage, Stuttgart, 1961, pp. 411 to 420. It is of course also possible to use mixtures of emulsifiers and/or protective colloids. As dispersants it is preferred to employ exclusively emulsifiers, whose relative molecular weights, unlike the protective colloids, are usually below 1000. Another difference between these emulsifiers and their protective colloids is that the former are capable of forming micelles in water above the critical micelle-forming concentration.

Emulsifiers used may be anionic, cationic or nonionic in nature. Of course, where mixtures of surface-active substances are used, the individual components must be compatible with one another, and this can be checked in cases of doubt by the use of a few preliminary experiments. In general, anionic emulsifiers are compatible with one another and with nonionic emulsifiers. Where anionic emulsifiers are employed, their counterion is preferably ammonium. Examples of useful emulsifiers are ethoxylated mono-, di- and trialkylphenols (EQ degree: 3 to 50, alkyl radical: $C_4$ to $C_9$), ethoxylated fatty alcohols (EO degree: 3 to 50, alkyl radical: $C_8$ to $C_{36}$), and alkali metal and ammonium salts of alkyl sulfates (alkyl radical: $C_8$ to $C_{12}$), of sulfuric acid monoesters of ethoxylated alkanols (EO degree: 2 to 20, alkyl radical: $C_{10}$ to $C_{18}$) and of ethoxylated alkylphenols (EO degree: 3 to 50, alkyl radical: $C_4$ to $C_9$), of alkyklsulfonic acids (alkyl radical: $C_{12}$ to $C_{18}$) and of alkylaryl sulfonic acids (alkyl radical: $C_9$ to $C_{18}$). Mention may be made, by way of example, of the alkali metal and/or ammonium salts of dodecylbenzenesulfonic acid and of the alkali metal and/or ammonium salts of the sulfuric acid monoester of ethoxylated dodecanol (EO degree: 2 to 4). Further suitable emulsifiers can be found in the abovementioned Houben-Weyl volume, pp. 192–208.

Other surface-active substances which have been found suitable are compounds of the general formula I

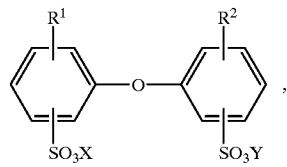

where $R^1$ and $R^2$ are hydrogen or $C_4$14 $C_{24}$-alkyl and are not simultaneously hydrogen, and X and Y can be alkali metal and/or ammonium ions. $R^1$ and $R^2$ are preferably linear or branched alkyls of 6 to 18 carbon atoms or hydrogen, and especially of 6, 12 and 16 carbon atoms, and again are not both simultaneously hydrogen. X and Y are preferably sodium, potassium or ammonium ions, particularly preferably sodium. Individual mention may be made of compounds I where X and Y are sodium or ammonium, $R^1$ is branched alkyl of 12 carbons and $R^2$ is hydrogen or $R^1$. Use is frequently made of technical-grade mixtures comprising a proportion-of from 50 to 90% by weight of the monoalkylated product, examples being Dowfax® 2 A1 (trademark of Dow Chemical Company).

In general, the quantity of dispersant employed is from 1 to 3% by weight, based on the monomers to be free-radically polymerized. It is of advantage in accordance with the invention that in general ≦2% by weight, or ≦1.5 or ≦1% by weight of dispersant (related correspondingly as above) are sufficient for the preparation even of the aqueous polymer dispersions which have been used with the greatest preference.

In order to control the molecular weight of the resulting polymer, polymerization is normally carried out in the presence of molecular weight regulators such as mercaptans (thiols), for example n-dodecyl mercaptan or tert-dodecyl mercaptan. The quantity of molecular weight regulator used, based on the quantity of monomers to be polymerized, is typically from 0.1 to 5% by weight, usually not more than 2.5% by weight.

Polymerization is carried out in general under an inert gas atmosphere. On the industrial scale, free-radical aqueous emulsion polymerizations are usually carried out in iron or steel reactors. In order to avoid the adverse effects of very small traces of iron dissolving in the course of the polymerization, it is normal to add chelating agents capable of complexing iron ions to the polymerization mixture. Typical representatives of such agents are Trilon® B (the disodium salt of ethylenediamine-tetraacetic acid). Quantities below 1% by weight are generally sufficient for the use of chelating agents, relative to the monomers to be polymerized.

For reliable dissipation of the heat of reaction, the industrial implementation of free-radical aqueous emulsion polymerization for the preparation of the aqueous polymer dispersions to be used in accordance with the invention is expediently carried out by the monomer feed method. In other words, only part of the polymerization batch is included in the initial charge to the polymerization vessel, and, in particular, the predominant amount of the monomers to be polymerized is supplied continuously to the polymerization vessel in proportion with their consumption. Preferably, the monomers are supplied as a pre-emulsion in the aqueous medium. In general, the continuous supply of monomers is accompanied by a synchronous supply of initiator. In order to improve the reproducibility of the mean polymer particle size, the initial charge advantageously comprises a small quantity of a very fine preformed aqueous polymer dispersion (a seed latex). Typically, the number-average polymer particle diameter $\bar{d}_n$ of the substantially monodisperse seed latex is 30 nm. It is additionally advantageous if the seed latex is a polystyrene seed. For reasons of increased stability of the disperse distribution of the seed latex particles, the initial charge generally comprises, when α, β-monoethylenically unsaturated carboxylic acids are to be copolymerized, a part thereof. The chelating agent is also normally part of the initial charge. If molecular weight regulators are used, they are generally a constituent of the monomer feed stream.

In order to remove volatile organic constituents from the resulting aqueous polymer dispersion, the latter is frequently subjected, following the actual polymerization process, to both chemical and physical deodorizing treatment. In the case of chemical deodorizing, a specific polymerization initiator (for example the system comprising tert-butyl hydroperoxide/sodium disulfite/acetone) is added to the aqueous polymer dispersion, and provides for particularly effective initiation of polymerization of monomers which have not been incorporated by polymerization under the actual polymerization conditions (residual monomers), as a result of which they are bound chemically into the polymer chains. After chemical deodorizing, noncopolymerizable volatile organic constituents are usually eliminated further by stripping with steam (physical deodorizing). In this way it is possible to obtain aqueous polymer dispersions, suitable for use in accordance with the invention, whose residual content of volatile organic compounds is <100 ppm (based on the mass of the aqueous polymer dispersion). After ending the free-radical aqueous emulsion polymerization, the aqueous dispersion medium of the resulting aqueous polymer dispersions generally has a pH <6. Increasing the pH of the aqueous dispersion medium is advantageously carried out by adding organic amines and/or ammonia. Less preferred in accordance with the invention is the use of metal hydroxides (for example alkali metal hydroxides) for increasing the pH of the aqueous dispersion medium. In most cases the aqueous polymer dispersions to be used in accordance with the invention are prepared with a solids content of from 40 to 70, preferably from 50 to 60, % by weight.

In accordance with the invention which is favorable for the films of the aqueous polymer dispersions to be used in accordance with the invention to have not only an enhanced barrier effect relative to water vapor but also an enhanced repellency to water in the liquid state of aggregation. This ensures permanent adhesion even in the case of wetting from behind, and prevents the formation of blisters and cracks. Accordingly, the aqueous polymer dispersions to be used in accordance with the invention are also suitable as binders for sealing compounds. With particular advantage they are used around installations in walls to seal such joints against both steam and condensation. In this case a primer coating is generally applied first of all, into which a woven fabric (for example a woven glass fiber mat) is often placed. After this, a final coating is applied.

As already mentioned, the aqueous polymer dispersions to be used in accordance with the invention can be applied by themselves as a water-vapor barrier coating (primer or topcoat). In most cases, however, they are used with the addition of finely divided inorganic pigments. In this respect it is advantageous that the aqueous polymer dispersions to be used in accordance with the invention also have an enhanced pigment binding capacity. Typical pigment volume concentrations, in % by volume, are up to 60, generally from 10 to 60, frequently from 10 to 55 and often from 20 to 45. The pigmented systems are also particularly suitable as sealing compounds.

Suitable finely divided inorganic pigments include mica, kaolin, heavy spar, talc, quartz sand, quartz flour, chalk, titanium dioxide, dolomite, ground baryte, hydrophobized, finely divided silica, iron oxide and other color pigments. If desired it is also possible to use organic pigments for coloring purposes. The maximum particle diameter of such pigments is generally from 1 to 100 μm. Since the inorganic pigments are generally substantially insoluble in the aqueous medium, it is possible in this way to obtain aqueous polymer formulations, to be used in accordance with the invention, whose content of alkali metal ions dissolved in the aqueous medium, based on the mass of the dispersed polymer present, is ≦0.5 or ≦0.4 or ≦0.3 or ≦0.2 or ≦0.1 or ≦0.05 or, preferably, ≦0.01 or 0% by weight. It is not disadvantageous according to the invention if corresponding restrictions are made regarding the content of alkaline earth metal ions and of other metal ions.

In addition to pigments, novel aqueous polymer formulations to be applied as novel water-vapor barriers usually also comprise defoamers, thickeners, pigment-dispersing agents and preservatives. In general the overall quantity of these auxiliaries, including the dispersants of the aqueous polymer base dipsersion, is ≦10% by weight, preferably ≦5% by weight, based on the overall mass of the aqueous formulation. Preferably, these auxiliaries also contain no water-soluble alkali metal ions or water-soluble metal ions at all. The novel water-vapor barriers are typically applied in dry-film thicknesses of up to 2 mm or more if desired. Finally, it is found that the novel water-vapor barriers also show long-term effectiveness on alkaline substrates, with the result that it is possible, for example, to avoid or reduce hydrolysis reactions of subsequently applied adhesives.

In general, the water-vapor diffusion resistance index $S_d/S$ (cf. working examples) of the novel water-vapor barriers is ≧10,000. At the same time, elongations at break of ≧200% and a tear strength ≧1.5 N/mm² are possible (based on water-vapor barriers stored under dry conditions).

In conclusion, other possible uses of the novel aqueous polymer dispersions or formulations may be noted: use as primer (especially on mineral substrates such as cement mortar or plasterboard), use as crown cork sealant (can sealant), use as additive for modifying cement mortar, use for coating concrete to protect it against drying out during setting, and use as binder for anticorrosion coatings (protection against water).

EXAMPLE a) Preparation of an Aqueous Polymer Dispersion ED to be Used in Accordance with the Invention The following were supplied as initial charge to a 160 l steel reactor fitted with an anchor stirrer:

15,000 g of water,
1120 g of a finely divided aqueous polystyrene seed latex ($\bar{d}_n$=30 nm, solids content=33% by weight, containing as dispersant 20% by weight, based on the mass of polystyrene, of sodium dodecylbenzenesulfonate),
53 g of sodium peroxodisulfate,
5300 g of a 5% strength by weight aqueous solution of itaconic acid, and
27 g of the disodium salt of ethylenediaminetetra-acetic acid.

The initial charge was flushed 3 times with nitrogen and heated with stirring to the polymerization temperature of 80°

C., which was maintained during the polymerization. On reaching an internal reactor temperature of 70° C., the continuous metered addition to the polymerization vessel was begun, over the course of 5.5 h as feed stream 1, of a monomer emulsion of 16,300 g of water, 23,300 g of butadiene, 28,600 g of styrene, 530 g of acrylic acid, 265 g of acrylamide, 1700 g of a 28% strength aqueous solution of the sodium salt of alpha-sulfo-omega (dodecyloxy)poly-(oxyethylene) having a mean EO chain length of 2–3 units, and 770 g of tert-dodecyl mercaptan.

Beginning at the same time as the feed stream 1, a solution of 160 g of sodium peroxodisulfate in 6000 g of water was passed continuously into the polymerization vessel over the course of 6 h as feed stream 2.

After the end of the addition of feed stream 2, the polymerization mixture was held at 80° C. with stirring for 2 hours more. Then, still at 80° C., a solution 1 of 105 g of tert-butyl hydroperoxide in 1250 g of water and a solution 2 of 1260 g of water, 111 g of sodium disulfite and 69 g of acetone were metered continuously and synchronously into the polymerization vessel over the course of 2 h (chemical deodorizing). The pH of the aqueous dispersion medium was then adjusted to the alkaline range by adding 25% strength by weight aqueous ammonia solution, and then physical deodorizing is carried out by passing steam through the medium.

An aqueous polymer dispersion to be used in accordance with the invention was obtained whose solids content was 53.1% by weight, whose dispersed polymer particles had a $\bar{d}_z$ of 162 nm, whose dispersion medium showed a pH of 8.3 and whose residual content of volatile organic constituents was below 100 ppm. The dispersed polymer had the following monomer composition:

| | |
|---|---|
| 54.3% by weight | of styrene, |
| 43.7% by weight | of butadiene, |
| 1.0% by weight | of acrylic acid, |
| 0.5% by weight | of itaconic acid and |
| 0.5% by weight | of acrylamide. |

The glass transition temperature of its films was −3° C. Based on the quantity of dispersed polymer, the aqueous polymer dispersion ED had an alkali metal content of 0.14% by weight and an overall dispersant content of 1% by weight.

b) Polymer Comparison Dispersions CD1 to CD7

CD1:Like ED but the pH was increased not with ammonia but with sodium hydroxide.

The resulting aqueous polymer dispersion CD1 had an alkali content of 0.99% by weight based on dispersed polymer.

CD2:Like ED, but the quantity of styrene in feed stream 1 was 39,190 g and the quantity of butadiene in the same feed stream was 12,710 g.

CD3:Like ED, but the quantity of styrene in feed stream 1 was 5300 g and the quantity of butadiene in the same feed stream was 46,600 g.

| CD4:An aqueous polymer dispersion whose dispersed polymer had the following monomer composition | |
|---|---|
| 50% by weight | of n-butyl acrylate, |
| 46% by weight | of styrene, |
| 1.5% by weight | of acrylamide and |
| 2.5% by weight | of acrylic acid. |

Its GA value was 0.15% by weight and the pH of the aqueous dispersion was adjusted to 8.3 with ammonia. $\bar{d}_z$ was 156 nm and the solids content was 53% by weight. The glass transition temperature of its film was +12° C.

| CD5:Like CD4 but the monomer composition was | |
|---|---|
| 51% by weight | of styrene, |
| 45% by weight | of 2-ethylhexyl acrylate, |
| 3% by weight | of acrylic acid and |
| 1% by weight | of acrylamide. |

The GA value was 0.20% by weight, $\bar{d}_z$ was 172 nm. The glass transition temperature of its films was +6° C.

| CD6:Like CD4 but the monomer composition was as follows | |
|---|---|
| 51% by weight | of 2-ethylhexyl acrylate, |
| 47% by weight | of methyl methacrylate, |
| 0.25% by weight | of butanediol diacrylate and |
| 1.75% by weight | of acrylic acid. |

The GA value was 0.21% by weight, $\bar{d}_z$ was 175 nm and the glass transition temperature of its films was −5° C.

CD7:Diofan A 601.

(c) Formulation of Aqueous Polymer Formulations from the Aqueous Polymer Dispersions ED and CD1 to CD7, Suitable as Water-vapor Barriers Formulation Recipe 465 g of aqueous polymer dispersion, 7 g of Byk®-035 (defoamer from BYK-Chemie GmbH, Wesel, DE), 2 g of preservative, 3 g of Pigmentverteiler [pigment-dispersing agent] N, 30% strength by weight (from BASF AG, Ludwigshafen, DE), 3 g of Lanco®-Gel CP 15 (hydroxypropylgalactomannan thickeners from Langer & Co. GmbH, Ritterhude, DE), 5 g of Kronos® 2056 (finely divided TiO$_2$ (rutile) from Kronos Titan-GmbH, Leverkusen, DE), 3 g of black iron oxide, 136 g of Barythmehl/N (ground barytes, maximum particle diameter 40 μn, from Sachtleben GmbH, Duisburg, DE), 364 g of Microdol® 1 (mixture of finely divided CaCO$_3$ and MgCO$_3$, maximum particle diameter of 5 to 10 μm, from Norwegian Talk Deutschland GmbH, Bad Soden-Salmünster, DE), 6 g of Byk-035 and 6 g of Collacral® PU, 75.5% strength by weight (polyurethane-based associated thickener from BASF AG, Ludwigshafen, DE).

The pigment volume concentration of the resulting formulations was about 40% by volume. Their solids content was about 77% by weight (the quality of the formulation can be improved in the context of the invention by using, instead of Pigmentverteiler [pigment-dispersing agent] N, a corresponding quantity of Pigmentverteiler A from BASF AG).

d) Determination of the Performance Properties of Films of the Formulations from c)

1. Determination of tear strength TS [N/mm$^2$] and elongation at break EB [%] using a pull-off speed of 200 mm/min in accordance with DIN 53 504 (8 days of dry storage, and 8 days of dry storage foll-wed by 3 days of wet storage); 23° C.;
2. Determination of the water-vapor permeability WVP [g/m$^2$ per day] in accordance with DIN 52 615 (dry film thickness 0.6 mm) with a humidity gradient from 50% to 93% relative atmospheric humidity and at 23° C.;
3. Determination of the water uptake wa [% by weight] after 48 h and after 96 h; 23° C.

The results obtained are shown in the following table.

TABLE

| Polymer dispersion | TS dry | TS wet | EB dry | EB wet | WVP | Wa 48 | Wa 96 | $S_d$ |
|---|---|---|---|---|---|---|---|---|
| ED | 1.93 | 1.13 | 268 | 568 | 1.9 | 3.5 | 5 | 9.9 |
| CD1 | 2.04 | 1.13 | 251 | 508 | 10.2 | 14.8 | 15.8 | 1.9 |
| CD2 | the formulation did not form a coherent film | | | | | | | |
| CD3 | 0.54 | 0.32 | 53 | 123 | 1.8 | 3.8 | 4.7 | 10.8 |
| CD4 | — | — | — | — | 31.2 | — | — | 0.6 |
| CD5 | — | — | — | — | 16.6 | — | — | 1.2 |
| CD6 | — | — | — | — | 35.2 | — | — | 0.6 |
| CD7 | — | — | — | — | 2 | — | — | 11 |

(the formulation was found to be unstable on storage)

From the WVP value it is possible to calculate the diffusion-equivalent air layer thickness $S_d$ [m]. This indicates the required thickness of a static layer of air having the same water-vapor diffusion resistance as a film of the thickness S. The water-vapor diffusion resistance index, which constitutes a material constant, is found to be $S_d/S$. For the formulation using ED it is 17,333.

We claim:

1. An aqueous polymer dispersion whose polymer, present in disperse distribution, is composed in free-radically polymerized form of from 50 to 60% by weight of the polymer of at least one vinyl-aromatic monomer (monomers A), from 40 to 50% by weight of the polymer of at least one monomer having two conjugated, ethylenically unsaturated double bonds (monomers B), and from 0.5 to 10% by weight of the polymer of monomers selected from the group consisting of α,β-monoethylenically unsaturated mono- and dicarboxyiic acids having 3 to 6 carbon atoms, and their amides (monomers C), and whose content GA of alkali metal ions, based on the mass of the dispersed polymer, is ≦0.5% by weight.

2. A dispersion as claimed in claim 1, wherein the monomers A consist of styrene and/or vinyltoluene.

3. A dispersion as claimed in claim 1, wherein styrene is the sole monomer A.

4. A dispersion as claimed in claim 1, wherein the monomers B consist of butadiene and/or isoprene.

5. A dispersion as claimed in claim 1, wherein butadiene is the sole monomer B.

6. A dispersion as claimed in claim 1, wherein the monomers C are selected from the group consisting of acrylic acid, methacrylic acid, itaconic acid, acrylamide and methacrylamide.

7. A dispersion as claimed in claim 1, wherein the monomers C are a mixture of at least one α,β-monoethylenically unsaturated carboxylic acid having 3 to 6 carbon atoms and comprising one or two carboxyl groups, and of at least one amide of these carboxylic acids.

8. A dispersion as claimed in claim 1, whose z-mean polymer particle diameter is from ≧100 to ≧250 nm.

9. A dispersion as claimed in claim 1, whose z-mean polymer particle diameter is from ≧140 to ≧200 nm.

10. A dispersion as claimed in claim 1, whose aqueous dispersion medium has a pH ≧6.

11. A dispersion as claimed in claim 1, whose aqueous dispersion medium has a pH from 7 to 10.

12. A dispersion as claimed in claim 1, wherein GA is ≦0.4% by weight.

13. A dispersion as claimed in claim 1, wherein GA is ≦0.3% by weight.

14. A dispersion as claimed in claim 1, wherein GA is ≦0.2% by weight.

15. A dispersion as claimed in claim 1, wherein GA is ≦0.1% by weight.

16. A dispersion as claimed in claim 1, wherein GA is ≦0.05% by weight.

17. A dispersion as claimed in claim 1, which contains no alkali metal.

18. A dispersion as claimed in claim 1, whose dispersed polymer has a glass transition temperature from −30 to +15° C.

19. A dispersion as claimed in claim 1, whose dispersed polymer has a glass transition temperature from −10 to +5° C.

20. A dispersion as claimed in claim 1, whose solids content is from 40 to 70% by weight.

21. A dispersion as claimed in claim 1, whose solids content is from 50 to 60% by weight.

22. A dispersion as claimed in claim 1, films of which have a water-vapor diffusion resistance index ≧10,000, a tear strength of ≧1.5 N/mm$^2$ and an elongation at break of ≧200%.

23. An aqueous polymer formulation which comprises an aqueous polymer dispersion as claimed in claim 1 and finely divided pigments in a pigment volume concentration of up to 60% by volume.

24. An aqueous polymer formulation which comprises an aqueous polymer dispersion as claimed in claim 1 and finely divided pigments in a pigment volume concentration of from 20 to 45% by volume.

25. A formulation as claimed in either claim 23 or 24, whose content of alkali metal ions dissolved in the aqueous medium, based on the mass of the dispersed polymer present, is ≦0.5% by weight.

26. A formulation as claimed in either claim 23 or 24, whose content of alkali metal ions dissolved in the aqueous medium, based on the mass of the dispersed polymer present, is ≦0.3% by weight.

27. A formulation as claimed in either claim 23 or 24, whose content of alkali metal ions dissolved in the aqueous medium, based on the mass of the dispersed polymer present, is ≦0.2% by weight.

28. A formulation as claimed in claim 23, films of which have a water-vapor diffusion resistance index ≧10,000, a tear strength of ≧1.5 N/mm$^2$ and an elongation at break of ≧200%.

29. A method of use a dispersion as claimed in claim 1 for producing a water-vapor barrier.

30. A method of use a formulation as claimed in claim 24 for producing a water vapor barrier.

31. A method of use a dispersion as claimed in claim 1 for coating substrates.

32. A method of use a formulation as claimed in claim 24 for coating substrates.

33. A method of use as claimed in either claim 31 or 32, wherein the substrate is concrete, plaster, plasterboard, compressed wood, plywood, fiberboard, wood, cement mortar, masonry or cement.

34. A substrate coated with a film of a dispersion as claimed in claim 1.

35. A substrate coated with a film of a formulation as claimed in claim 24.

36. A method of use a dispersion as claimed in claim 1 for coating the interior walls of damp rooms.

37. A method of use a dispersion as claimed in claim 1 for coating the exterior walls of refrigeration rooms.

38. A method of use a formulation as claimed in claim 24 for coating the interior walls of damp rooms.

39. A method of use a formulation as claimed in claim 24 for coating the exterior walls of refrigeration rooms.

40. A process for preparing a dispersion as claimed in claim 1 by free-radical aqueous emulsion polymerization of the starting monomers A, B and, if used, C in a ratio corresponding to the desired polymer structure, which comprises adding ammonia and/or an organic amine in order to increase the pH of the aqueous dispersion medium.

41. A method of use a formulation as claimed in claim 24 as a sealing compound.

* * * * *